United States Patent
Granger et al.

(10) Patent No.: US 10,146,066 B2
(45) Date of Patent: Dec. 4, 2018

(54) PROCESS FOR MANUFACTURING AN OPHTHALMIC LENS USING VOXELS AND THE LENS THUS OBTAINED

(71) Applicant: ESSILOR INTERNATIONAL (COMPAGNIE GENERALE D'OPTIQUE), Charenton-le-Pont (FR)

(72) Inventors: Berangere Granger, Charenton-le-Pont (FR); Gilles Baillet, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 14/660,964

(22) Filed: Mar. 18, 2015

(65) Prior Publication Data

US 2015/0277150 A1   Oct. 1, 2015

(30) Foreign Application Priority Data

Mar. 28, 2014   (EP) .................................. 14305456

(51) Int. Cl.
| | |
|---|---|
| *B29C 64/112* | (2017.01) |
| *B33Y 10/00* | (2015.01) |
| *G02C 7/06* | (2006.01) |
| *B33Y 70/00* | (2015.01) |
| *B33Y 80/00* | (2015.01) |
| *B29D 11/00* | (2006.01) |

(Continued)

(52) U.S. Cl.
CPC .............. *G02C 7/06* (2013.01); *B29C 64/112* (2017.08); *B29D 11/00028* (2013.01);
(Continued)

(58) Field of Classification Search
CPC ......... B33Y 10/00; B33Y 70/00; B33Y 80/00; G02C 7/022; G02C 7/06; G02C 2202/24;
(Continued)

(56) References Cited

U.S. PATENT DOCUMENTS 2,065,132 A * 12/1936 Hammon ................. G02C 7/06
351/159.41
4,022,855 A   5/1977 Hamblen
(Continued)

FOREIGN PATENT DOCUMENTS

JP   63-204229 A   8/1988

OTHER PUBLICATIONS

European Search Report, dated Jun. 11, 2014, from corresponding European application.
(Continued)

*Primary Examiner* — William R Alexander
*Assistant Examiner* — Henry Duong
(74) *Attorney, Agent, or Firm* — Young & Thompson (57) ABSTRACT

A process for manufacturing a negative ophthalmic lens having a central portion (50) and a peripheral portion (52) includes the steps of forming the central portion (50) by forming voxels of a first material having a first refractive index, the central portion having a peripheral zone at its periphery; and forming the peripheral portion (52) from this peripheral zone and contiguous to the perimeter of this peripheral zone, by forming voxels of at least one second material having a second refractive index, the second refractive index being strictly higher than the first refractive index.

14 Claims, 2 Drawing Sheets

(51) Int. Cl.
*G02B 3/00* (2006.01)
*B29L 11/00* (2006.01)

(52) U.S. Cl.
CPC .. B29D 11/00048 (2013.01); B29D 11/00432 (2013.01); B33Y 70/00 (2014.12); B33Y 80/00 (2014.12); *B29L 2011/0016* (2013.01); *G02B 3/0087* (2013.01)

(58) Field of Classification Search
CPC ...... G02C 2202/16; G02C 7/02; G02C 7/061; G02C 7/063; G02C 7/065; G02C 7/066; G02C 7/068; B29D 11/00028; B29D 11/00048; B29D 11/00432; G02B 3/0087; B29L 2011/0016; B29C 67/0059; B29C 64/112; A61F 2/16
USPC .................................................. 351/159.43
See application file for complete search history.

(56) References Cited

U.S. PATENT DOCUMENTS

| | | | | |
|---|---|---|---|---|
| 8,523,633 | B2* | 9/2013 | Schneider | ............... B24B 13/00 351/159.01 |
| 2001/0048968 | A1 | 12/2001 | Cox et al. | |
| 2004/0008319 | A1* | 1/2004 | Lai | ................... B29D 11/00355 351/159.02 |
| 2009/0174863 | A1* | 7/2009 | Widman | .......... B29D 11/00134 351/159.6 |
| 2009/0257026 | A1* | 10/2009 | Varnas | ................... G02C 7/063 351/159.5 |
| 2010/0041318 | A1* | 2/2010 | Schneider | ............... B24B 13/00 451/42 |
| 2014/0242176 | A1* | 8/2014 | Robledo | .............. A61K 9/0048 424/490 |
| 2014/0272176 | A1* | 9/2014 | Pugh | ........................ G02C 7/04 427/508 |
| 2015/0146159 | A1* | 5/2015 | Archer | ............. B29D 11/00144 351/159.03 |
| 2015/0253585 | A1* | 9/2015 | Anatole | .............. B29C 67/0062 264/1.7 |

OTHER PUBLICATIONS

H.-J. Trost et al., "Using Drop-On-Demand Technology for Manufacturing GRIN Lenses", Nov. 15, 2001, retrieved from the Internet: URL:http://www.microfab.com/archive/about/papers/ASPE_01.pdf.

* cited by examiner

PROCESS FOR MANUFACTURING AN OPHTHALMIC LENS USING VOXELS AND THE LENS THUS OBTAINED

TECHNICAL FIELD OF THE INVENTION

The present invention generally relates to optics for correcting ametropia.

It more particularly relates to a negative ophthalmic lens intended to correct myopia and to a process for manufacturing such a lens.

PRIOR ART

The ophthalmic lenses used to treat myopia (spectacle lenses for example) conventionally have a concavity at the center of the lens in order to make light rays diverge, thereby compensating for the excessively rapid convergence of the latter in the eye of a myopic individual.

The thickness of these lenses therefore increases with distance from the center of the lens and may reach thicknesses of several millimeters at the periphery of the lens, in particular when a strong correction is required.

Such a thickness at the periphery poses both esthetic and practical problems, in particular in the case of spectacle lenses where the lens is borne by a frame.

To decrease this thickness, one solution consists in choosing, to produce the lens, a material having a high refractive index. However, such materials in general have a substantial dispersive power, which may degrade the visual comfort of the wearer, with for example colored fringes being perceived.

SUBJECT OF THE INVENTION

In this context, the present invention relates to a process for manufacturing a negative ophthalmic lens comprising a central portion and a peripheral portion, characterized in that it comprises the following steps:
forming the central portion by forming voxels of a first material having a first refractive index, the central portion having a zone at its periphery; and
forming the peripheral portion from said zone and contiguous to the perimeter of said zone, by forming voxels of at least one second material having a second refractive index, the second refractive index being strictly higher than the first refractive index.

Thus, by virtue of an additive manufacturing process, an ophthalmic lens is obtained the central portion of which (corresponding to the useful zone of the lens) has a relatively low refractive index, thereby especially allowing the aforementioned iridescence effect to be avoided, but the edges of which will be of limited thickness by virtue of the use of a material having a higher refractive index to form the peripheral portion.

Additive manufacturing is a manufacturing technique defined in international standard ASTM 2792-12 and designates a process for assembling elements of material to obtain a solid three-dimensional object on the basis of a digital three-dimensional model.

Such a process is sometimes referred to as 3-D printing or material printing because successive layers of materials may be deposited in succession one on the precedent. The layers, which correspond to virtual cross sections extracted from the three-dimensional model, are assembled and fused in order to form the solid three-dimensional object, here an ophthalmic lens.

The expression "additive manufacturing" especially designates processes that create solid objects by juxtaposing volume elements or voxels with a preset geometry defined by the three-dimensional model (typically in a computer-aided design (CAD) file). The term "juxtaposing" is understood to mean sequential operations, for example especially deposition of a layer on the precedent, or the deposition of a voxel making contact with or nearby a voxel deposited beforehand.

Moreover, the term "voxel" is understood to mean an individual element that, in combination with other voxels, defines an intermediate element, a layer for example. The term "voxel" may also apply to an intermediate element, for example a layer, in particular when stereolithography techniques are used.

Thus, depending on the additive manufacturing technique used, the ophthalmic lens will possibly be produced voxel by voxel, line by line or layer by layer.

The formation of voxels may for example comprise:
depositing a droplet of liquid composition on a substrate;
applying a liquid composition in the form of a thin film and selectively polymerizing this thin film;
depositing a liquid composition in filament form.

The first refractive index is for example lower than or equal to 1.59 and preferably comprised between 1.50 and 1.59, inclusive. The second refractive index is for example higher than or equal to 1.60 and preferably comprised between 1.60 and 1.80, inclusive.

Provision may furthermore be made for a step of forming an intermediate portion located between said peripheral zone of the central portion and said peripheral portion, by forming voxels comprising a first material and a second material, the refractive index of said intermediate portion being strictly higher than the refractive index of said central portion and strictly lower than the refractive index of said peripheral portion.

According to one envisageable embodiment, the intermediate portion may be formed from a plurality of intermediate portions between said central portion and said peripheral portion, the refractive index of each of said intermediate portions increasing radially from the central portion to the peripheral portion, this radial index variation being obtained by forming voxels comprising, in succession, a decreasing amount of said first material and an increasing amount of said second material.

According to a first possibility, the voxels of the first material are formed by depositing a first polymerizable composition by means of a first printing nozzle and the voxels of the second material are formed by depositing a second polymerizable composition, different from the first polymerizable composition, by means of a second printing nozzle, said first and second printing nozzles being a single nozzle or two separate nozzles.

According to a second possibility, the voxels of the first material are formed by depositing a thermoplastic polymer in an initial liquefied state or fluid phase by means of a first dispensing unit and the voxels of the second material are formed by depositing a thermoplastic polymer in an initial liquefied state or fluid phase by means of a second dispensing unit, the first and second dispensing units being a single unit or two separate units.

According to other possibilities, the voxels of the first and second material may be formed by melting polymer powder or by stereolithography or even by extruding a thermoplastic filament.

The central portion for example has a generally circular or elliptical shape.

The invention also proposes a negative ophthalmic lens obtained by means of a process such as described above.

The ophthalmic lens obtained is for example a concave unifocal spherical lens of negative optical power comprised between −0.25 D and −20.00 D, more particularly comprised between −0.25 D and −12.00 D.

According to possible embodiments, the plurality of preset, juxtaposed and superposed voxels (or volume elements) forms superposed layers that each have a thickness that is constant or variable over their length and/or all have or do not have the same thickness;

the material is a photopolymer comprising one or more families of molecules having one or more acrylic, methacrylic, acrylate or methacrylate functions; a family of molecules having one or more epoxy, thioepoxy or thiolene functions; a family of molecules having one or more thiol, sulfide or episulfide functions; a family of molecules having one or more vinyl ether, vinyl caprolactam or vinylpyrolidone functions; a family of hyperbranched or hybrid organic/inorganic materials; or a combination of these functions; the mentioned chemical functions possibly being carried by monomers or oligomers or a combination of monomers and oligomers;

the material may comprise at least one photoinitiator;

the material may comprise nanoparticles, in particular nanoparticles having dimensions for example smaller than the visible wavelengths, such as for example:

nanoparticles of carbonates of alkaline-earth metals such as calcium carbonate for example;

nanoparticles of sulfates of alkaline-earth metals such as barium sulfate for example;

nanoparticles of metal oxides, such as alumina, zinc oxide or titanium dioxide for example;

nanoparticles of metalloid oxides, silica dioxide for example;

nanoparticles of metal sulfides, especially zinc sulfide;

siloxanes, such as the silsesquioxanes for example; and nanoparticles functionalizable with polymerizable organic groups, incorporating such nanoparticles in a monomer especially allowing the index of the latter to be increased;

the material may comprise, in at least certain of the preset volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as a rare-earth cryptates or chelates; incorporating such materials into the initial monomer formulation especially allowing tinted lenses or even lenses with a gradient tint to be obtained;

the manufacturing process comprises an additional thermal irradiation step and/or an additional actinic irradiation step, such as for example at ultraviolet wavelengths of the spectrum, or even no irradiation step;

the manufacturing process may comprises a step in which the index variation of the material of the ophthalmic lens is taken into account, taking the form of an iterative optimization loop according to known optimization procedures;

the material of the ophthalmic lens optionally comprises one or more dyes, and/or nanoparticles configured to modify its optical transmission and/or its appearance, and/or nanoparticles or additives configured to modify its mechanical properties;

the additive manufacturing machine is not a three-dimensional printing machine but rather a stereolithography machine (or SLA for "Stereolithograpy Apparatus") or a thermoplastic filament extrusion machine, also called a tensioned filament deposition machine (or FDM for "Fused Deposition Modeling"); and the command/control unit comprises a microcontroller instead of a microprocessor.

It is recalled more generally that the invention is not limited to the examples described and represented.

DETAILED DESCRIPTION OF AN EXAMPLE EMBODIMENT

The following description, given with regard to the appended drawings, which are given by way of nonlimiting example, will allow what the invention consists of and how it can be carried out to be understood.

Figure 1:
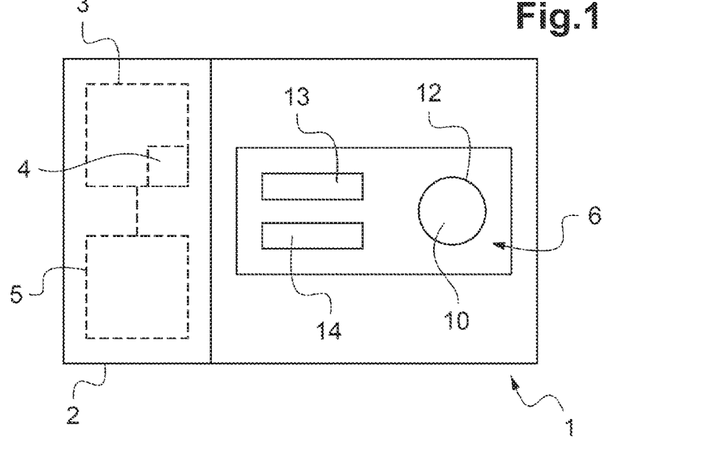
FIG. 1 schematically shows one example additive manufacturing machine usable in the context of the present invention.

In the appended drawings:

FIG. 1 shows an additive manufacturing machine 1 usable in the context of the present invention.

This additive manufacturing machine 1 comprises a command/control unit 2, a first nozzle 13, a second nozzle 14 and a manufacturing supporting member 12 on which an ophthalmic lens 10 will be manufactured by means of an additive manufacturing process such as described below.

The additive manufacturing machine 1 also comprises an aperture 6, here covered during the manufacturing phase by a removable shield, thereby allowing the ophthalmic lens 10 to be reached on the manufacturing supporting member 12 after manufacture by means of the additive manufacturing process.

The manufacturing supporting member 12 comprises a body provided with a manufacturing surface that has an overall geometry, all or some of which is independent or dependent on the geometry of at least one surface of the object to be produced by additive manufacturing. In the example described here, the manufacturing surface is flat; as a variant, it could for example be convex or concave.

The first nozzle 13 and the second nozzle 14 are for example included in a bank of nozzles; the first nozzle 13 and the second nozzle 14 are each controlled by the command/control unit 2 so as to be moved by actuators and to deliver elementary volumes (or voxels) of a material that will form, after an optional additional treatment (such as a photo-polymerization step), elementary portions of the ophthalmic lens 10.

In the example embodiment described here, the first nozzle 13 for example delivers a monomer allowing, after photo-polymerization, a first material to be obtained, here a (meth)acrylate derivative of linear or branched alkyls (having a refractive index of 1.5), and the second nozzle 14 delivers a monomer allowing, after photo-polymerization, a second material to be obtained, here a (meth)acrylate derivative of a bromided aromatic (such as bisphenol-A tetrabromoethoxylate dimethacrylate having a refractive index of 1.6 or mercaptoethyl sulfide dimethacrylate having a refractive index of 1.62).

Generally, the first material has a refractive index lower than that of the second material.

The command/control unit 2 is provided with a data processing system, especially comprising a microprocessor 3 and a nonvolatile memory 4 (here a read-only memory or ROM integrated into the microprocessor 3) in which instructions of a software package or computer program are stored that, when executed by the microprocessor 3, allows the additive manufacturing machine 1, and especially the first nozzle 13 and the second nozzle 14, to be controlled and thus the additive manufacturing process to be implemented, for example in accordance with one of the examples described below.

The command/control unit 2 furthermore comprises a modifiable memory 5, here a volatile random access memory (RAM), in which the data used during the execution of the software package and implementation of the additive manufacturing process are stored.

As a variant, the non-volatile memory 4 and/or the modifiable memory 5 could be a rewritable non-volatile memory, for example an electrically erasable programmable read-only memory (EEPROM).

The modifiable memory 5 especially stores elements for defining the ophthalmic lens 10 to be manufactured. These defining elements were for example received beforehand from another data-processing system (not shown) connected to the manufacturing machine 1 by means of a computer network.

These defining elements are for example data (typically taking the form of a file stored in the modifiable memory 5) that define the (three-dimensional) geometry of a central portion of the lens 10 and of a peripheral portion of the lens 10.

As a variant, the defining elements may be data that define the simple optical function prescribed to the ophthalmic lens 10 to be manufactured. According to one envisageable embodiment, the defining elements may comprise personalizing parameters of the future wearer of spectacles equipped with the ophthalmic lens 10 and/or parameters of the geometry of the frame that will bear the ophthalmic lens 10. According to one particularly advantageous embodiment of the invention, the optical personalizing elements relate to the central portion of the negative ophthalmic lens, the peripheral portion being dedicated to esthetic personalizing elements.

Specifically, the geometry of the ophthalmic lens 10 may be deduced from knowledge of the optical function and optionally of personalizing and/or frame parameters.

The expression "optical function of an ophthalmic lens" is understood to mean the optical response of this lens, i.e. a function defining any modification of the propagation and transmission of an optical beam through the lens in question, whatever the incidence of the entering optical beam and whatever the geometric extent of the entrance diopter illuminated by the incident optical beam.

More precisely, in the ophthalmic field, optical function is defined as the distribution of wearer power and astigmatism characteristics, of prismatic deviations and higher-order aberrations associated with the lens for all the directions of the gaze of a wearer of this lens. Of course, this assumes that the geometric position of the lens relative to the eye of the wearer is already known.

It will also be noted that wearer power is just one way of calculating and adjusting the power of the ophthalmic lens, another way being to use lensmeter power. Calculation of wearer power ensures that the power perceived by the wearer (i.e. the power of the beam of light that enters into the eye), once the lens has been fitted in the frame and is being worn by the wearer, corresponds to the prescribed power. At the optical center of a unifocal lens, wearer power is generally close to the power observed with a lensmeter positioned at this point.

The modifiable memory 5 (or as a variant the read-only memory 4) for example furthermore stores characteristics of materials (here the first material and the second material) that may be formed (here after photo-polymerization) from materials delivered by the first nozzle 13 and the second nozzle 14. These characteristics may optionally be taken into account when the geometry of the portions to be manufactured is determined (by the microprocessor 3), as explained below.

Likewise, the modifiable memory 5 (or as a variant the non-volatile memory 4) may store data defining the manufacturing area of the manufacturing supporting member 12, in particular when this surface is not flat (for example concave or convex as indicated above), and/or other data representing characteristic parameters of the additive manufacturing, for example the rate of advance of the nozzles 13, 14, the power and power source implemented in the subsequent treatment (here the photo-polymerization), for example here a source emitting in the ultraviolet (as a variant, a laser such as in the case of a stereolithography machine, or heating power in the case of deposition of a tensioned filament or extrusion of a thermoplastic filament).

Figure 2:
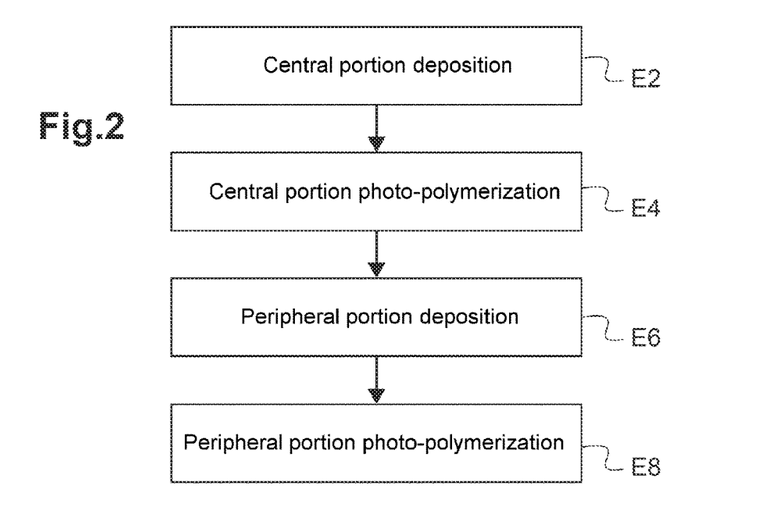
FIG. 2 shows the main steps of a first example process for manufacturing an ophthalmic lens according to the teachings of the invention.

FIG. 2 shows the main steps of a first example additive manufacturing process using the additive manufacturing machine in FIG. 1.

This process starts in step E2 with deposition, by means of the first nozzle 13 and under the control of the microprocessor 3, of a set of voxels intended to form the central portion of the ophthalmic lens 10. The central portion for example has a disc shape in projection onto a plane perpendicular to the optical axis of the ophthalmic lens 10. As a variant, it could have an oval shape, an elliptical shape for example.

In the aforementioned case where the geometry of the central portion is defined directly by defining elements stored in the modifiable memory 5, the microprocessor 3 controls the first nozzle 13 so as to deposit voxels in locations specified by the defining elements.

In the aforementioned case where the geometry of the central portion is defined by the optical function of the ophthalmic lens 10 and behavioral parameters of the wearer, the geometry of the central portion of the ophthalmic lens is determined beforehand by the microprocessor 3 on the basis of these elements. The central portion generally has a radius comprised between 5 mm and 18 mm from the geometric center of the lens.

Once the radius of the central portion has been defined, the geometry of the central portion is defined on the basis of defining elements representative of the sought-after optical function (and of the features of the materials used, which may also be stored in the modifiable memory 5 as indicated above).

Once the geometry of the central portion has thus been determined by the microprocessor 3 from defining elements stored in the modifiable memory 5, the microprocessor 3 controls the first nozzle 13 so that it deposits voxels in the locations specified by this geometry (step E2).

Next, a step E4 of photo-polymerization of the voxels deposited in step E2 is carried out in order to form the central portion. Because of the material delivered by the first nozzle 13 as indicated above, the central portion is formed from a transparent material having a refractive index equal to 1.50 (first material).

Under the control of the microprocessor 3 and by means of the second nozzle 14, voxels may then be deposited all the way around the perimeter of the central portion, and especially making contact with the latter, so as to form the peripheral portion of the ophthalmic lens 10 (step E6). The peripheral portion for example has a ring shape in projection onto a plane perpendicular to the optical axis.

As for the central portion, as explained above, the geometry of the peripheral portion is for example directly defined by defining elements stored in the modifiable memory 5.

As a variant, as also indicated above, the microprocessor 3 determines the geometry of the peripheral portion on the basis of defining elements stored in the modifiable memory 5.

Lastly, a step E8 of photo-polymerization of the voxels deposited in step E6 is then carried out, thereby allowing the peripheral portion to be formed. Because of the material delivered by the second nozzle 14 as indicated above, the peripheral portion is formed from a transparent material having a refractive index higher than or equal to 1.60 (second material).

In the example described above, voxels intended to form the central portion of the ophthalmic lens 10 are deposited first, and then voxels intended to form the peripheral portion of the ophthalmic lens 10.

As a variant, provision could be made for the voxels to be deposited in successive layers and for, in each layer, on the one hand voxels of the layer in question intended to form part of the central portion to be deposited, and on the other hand voxels of the layer in question intended to form part of the peripheral portion to be deposited. Reference may for example be made to the process described with reference to FIG. 4 for more ample explanation of this point.

Moreover, in the example described above, the photo-polymerization steps are carried out after the voxels intended to form the central portion have, on the one hand, been deposited, then after the voxels intended to form the peripheral portion have, on the other hand, been deposited.

As a variant, the photo-polymerization steps could take place immediately after the deposition of each voxel, comprehensively after passage of the first nozzle 13 or the second nozzle 14, or even after the deposition of a layer in the case of layered manufacture—as just described.

Figure 3:
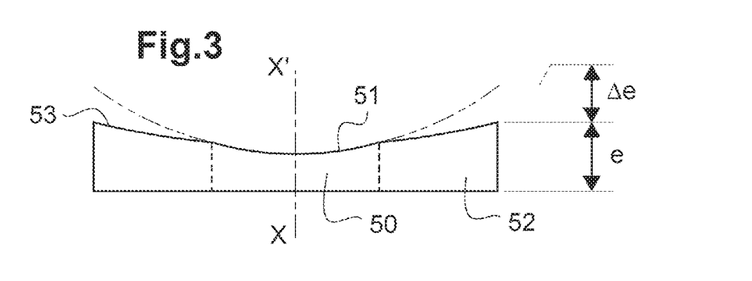
FIG. 3 shows a cross-sectional view of an ophthalmic lens obtained by the process in FIG. 2.

FIG. 3 shows a view of an ophthalmic lens 10 obtained by the process just described.

Such an ophthalmic lens 10 comprises a central portion 50, for example of generally circular shape centered on an optical axis XX', having a refractive index comprised between 1.50 and 1.59 (equal to 1.50 in the example described above), and a peripheral portion 52 having a higher refractive index and the exterior perimeter of which, here also of generally circular shape centered on the optical axis XX', defines the external circumference of the ophthalmic lens 10. The peripheral portion 52, and therefore the ophthalmic lens 10, could naturally have an exterior shape different from a circular shape, for example an exterior shape suitable for a spectacle frame intended to receive the ophthalmic lens 10.

Here, the ophthalmic lens 10 is a planar-concave lens that generates a negative correction intended to correct myopia. During the manufacture of the lens 10 by the additive manufacturing machine 1, the planar surface of the lens 10 is for example placed making contact with the manufacturing supporting member 12.

In the example shown, the central portion 50 comprises a concave face 51 the radius of curvature of which depends on the correction that must be made to the future wearer of the ophthalmic lens 10.

The peripheral portion 52 also comprises a concave face 53 that extends from the concave face 51 of the central portion 50. However, because the refractive index of the peripheral portion is higher than that of the central portion, the radius of curvature of the concave face 53 of the peripheral portion 52 is higher than that of the concave face 51 of the central portion 50 (in order to obtain the same correction).

Thus, the thickness e of the ophthalmic lens 10 on its periphery (and therefore on the periphery of the peripheral portion 52) is smaller by a difference $\Delta e$ than the thickness that the lens would have at its periphery if it were formed uniformly of the material forming the central portion 50.

Thus, an ophthalmic lens that is thinner at its edge is obtained (which is advantageous from the point of view of esthetics, wearer comfort and how easy it is to fit the lens into a frame, but also in that it makes the lens lighter), while having a useful optical zone (that corresponds to the central portion constructed as explained above) having a relatively low refractive index, thereby especially avoiding problems with perception of colored fringes, thus improving the visual comfort of the wearer. In addition, such an ophthalmic lens according to the invention is advantageously lighter than conventional lenses: specifically, the central portion is composed of a low-index material, and it is known that these materials in general have a lower density than high-index materials.

Figure 4:
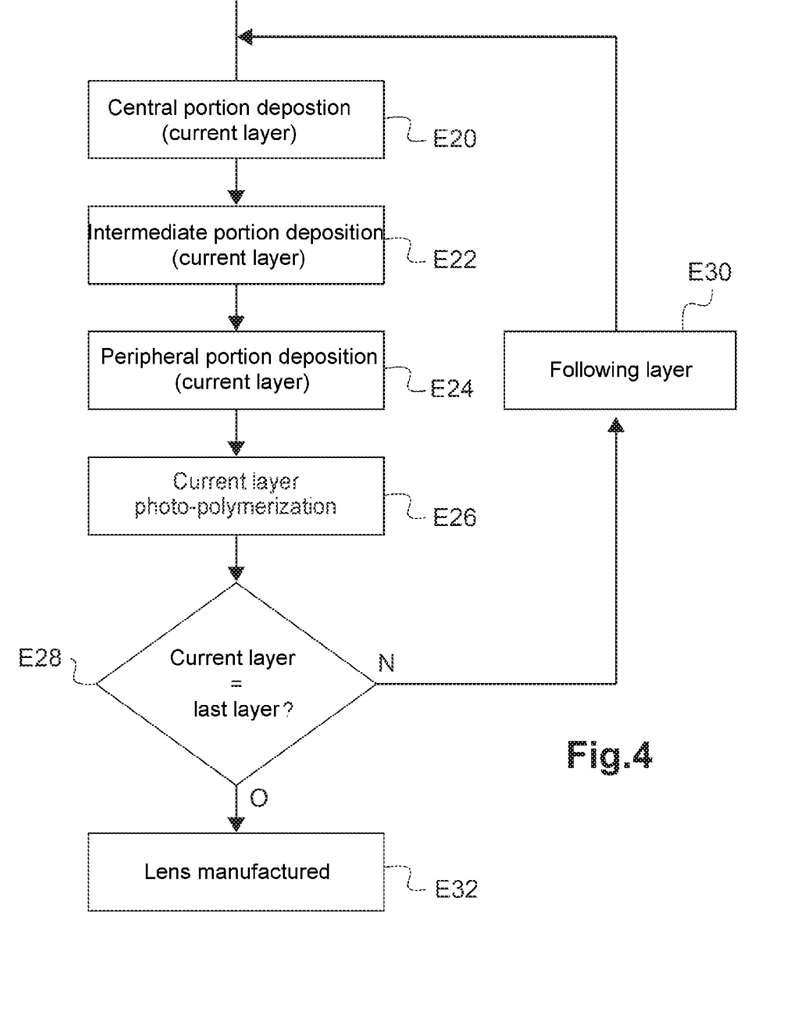
FIG. 4 shows the main steps of a second example process for manufacturing an ophthalmic lens according to the teachings of the invention.

FIG. 4 shows the main steps of a second example additive manufacturing process using the additive manufacturing machine in FIG. 1.

In this example, the ophthalmic lens 10 is formed by successive layers. Therefore, to start with a first layer of voxels is formed on the manufacturing supporting member 12. In the first iteration of steps E20 to E28 described below, the current layer is therefore the first layer.

Formation of the current layer for example starts with deposition, by means of the first nozzle 13 and under the control of the microprocessor 3, of a set of voxels that form the central portion of the current layer (step E20).

As in the embodiment in FIG. 2, the geometry of the deposition is determined (either directly, or by the microprocessor 3) on the basis of defining elements, here stored in the modifiable memory 5.

Formation of the current layer continues in step E22 with the deposition, by means of the first nozzle 13 and second nozzle 14 and under the control of the microprocessor 3, of voxels forming an intermediate portion of the current layer, around the central portion of the current layer and especially making contact with a peripheral zone of the central portion of the current layer.

The intermediate portion of the current layer thus has a generally annular shape (i.e. a ring shape), with an internal radius corresponding to the radius of the central portion of the current layer.

In the intermediate portion of the current layer, certain voxels are deposited by the first nozzle 13 whereas other voxels are deposited by the second nozzle 14:

either so as to be distributed equally over the intermediate portion taken as a whole (for example by depositing in alternation one voxel deposited by the first nozzle 13 and one voxel deposited by the second nozzle 14), thereby allowing (here after photo-polymerization as explained below) an intermediate portion to be obtained, the index of which is comprised between the index of the first material and the index of the second material;

or variably depending on the zone of the intermediate portion in question (for example by depositing a larger proportion of the material delivered by the first nozzle 13 in those zones of the intermediate portion that are located near the central portion and by depositing a larger proportion of the material delivered by the second nozzle 14 in those zones of the intermediate portion that are distant from the central portion), thereby allowing an index gradient (here a radial gradient) to be obtained in the intermediate portion (the index typically varying between the index of the first material and the index of the second material, for example according to a parabolic function of the radius r from the optical axis XX' of the ophthalmic lens).

As above, the location of the deposition of the voxels intended to form the intermediate portion is determined (either directly, or by the microprocessor 3) on the basis of defining elements, here stored in the modifiable memory 5.

Next, in step E24, a set of voxels that form the peripheral portion of the current layer is deposited, by means of the second nozzle 14 and under control of the microprocessor 3, around the intermediate portion of the current layer and especially making contact with a peripheral zone of the intermediate portion of the current layer.

The peripheral portion of the current layer thus has a generally annular shape (i.e. a ring shape), with an internal radius corresponding to the external radius of the intermediate portion of the current layer.

A step E26 of photo-polymerization of the current layer (which comprises the central portion deposited in step E20, the intermediate portion deposited in step E22 and the peripheral portion deposited in step E24) may then be carried out.

As indicated above, as a variant, the photo-polymerization step could be carried out at another moment, for example immediately after voxel deposition by either of the first and second nozzles 13, 14.

The microprocessor 3 then determines, in step E28, whether the current layer is the last layer to be treated or not (for example on the basis of defining elements stored in the modifiable memory 5).

If this is not the case, the process passes to treatment of the following layer (step E30) and loops to step E20 in order to implement steps E20 to E28 with the following layer by way of current layer.

If this is the case, the manufacturing process is terminated and the ophthalmic lens is therefore manufactured (step E32).

In the above description, each layer comprises a central portion, an intermediate portion and a peripheral portion. Naturally, provision may possibly be made for certain layers to contain only certain of these portions, for example only the intermediate portion and the peripheral portion, or even only one of these portions, for example the peripheral portion.

Figure 5:
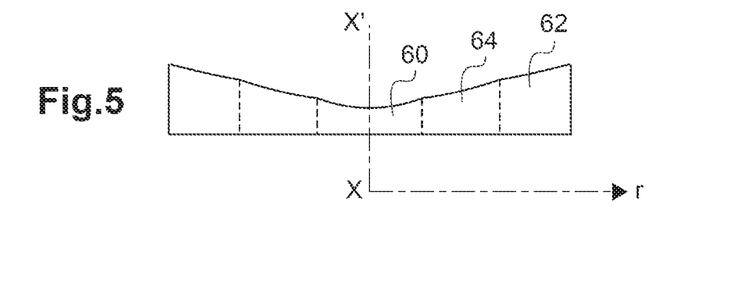
FIG. 5 shows a cross-sectional view of an ophthalmic lens obtained by the process in FIG. 4.

FIG. 5 shows a cross-sectional view of the ophthalmic lens obtained by the process in FIG. 4.

This ophthalmic lens comprises a central portion 60 (formed by superposition of the central portions of the various layers deposited in succession as described above with reference to FIG. 4), an intermediate portion 64 (formed by superposition of the intermediate portions of the various layers deposited in succession) and a peripheral portion 62 (formed by superposition of the peripheral portions of the various layers deposited in succession).

The central portion 60 has the general shape of a disk centered on the optical axis XX' of the ophthalmic lens (i.e. a circular shape in projection onto a plane perpendicular to the optical axis).

The intermediate portion 64 has a generally annular shape (in projection onto the same plane perpendicular to the optical axis) around the central portion 60 and contiguously to this central portion 60. The intermediate portion 64 for example extends (continuously) around the entire perimeter of the central portion 60.

The peripheral portion 62 may also have a generally annular shape (again in projection onto the aforementioned plane perpendicular to the optical axis) around the intermediate portion 64, possibly (continuously) around the entire perimeter of the intermediate portion 64. The exterior shape of the peripheral portion 62 (which defines that of the ophthalmic lens) is for example circular; as a variant, it could however be a different shape, especially in order to match the frame intended to bear the ophthalmic lens.

As indicated above, the central portion 60 is formed from the first material and therefore has a relatively low refractive index, for example comprised between 1.50 and 1.59. For its part, the peripheral portion 62 is formed from the second material and therefore has a relatively high refractive index, for example comprised between 1.60 and 1.80.

The intermediate portion 64 may, for its part, have uniformly (on the scale of the intermediate portion) an intermediate index, comprised between the index of the first material and the index of the second material; according to another envisageable embodiment (as explained above), the intermediate portion may have an index gradient, here a radial gradient, with for example an index varying parabolically with radius (relative to the optical axis XX').

The ophthalmic lens in FIG. 4 has the same advantages as the lens illustrated in FIG. 3, as indicated above. Furthermore, by virtue of the presence of the intermediate portion, the jumps in index are smaller from one portion to another, and the ophthalmic lens therefore has a more regular appearance.

In the process in FIG. 4, the intermediate portion 64 is obtained as explained above by forming voxels using the first nozzle 13 and the second nozzle 14.

As a variant, provision could be made for a third nozzle that delivers a material the refractive index of which, after photo-polymerization, is comprised between the refractive index of the first material and the refractive index of the second material, and that thus allows the voxels forming the intermediate part 64 to be formed.

Provision could furthermore be made for other additional nozzles that each deliver a different material so as to produce, by juxtaposition of voxels formed using the various nozzles, as many intermediate annular portions as there are nozzles, these intermediate portions being located between the central portion and the peripheral portion, the refractive index varying from one annular portion to another (increasing as a function of the average radius of the annular portion in question relative to the optical axis XX'), with for example each time a jump in index $\Delta n$ comprised between 0.01 and 0.1.

Use of the invention makes it possible to envision thickness savings, at the edges of the ophthalmic lens, relative to an ophthalmic lens, for a myopic individual, formed from a single material having a refractive index of 1.5 and obtained using conventional production means, of at least 20%, preferably of at least 30% to 50% and even of more than 50%. This edge thickness saving is especially dependent on the index difference between the first material and the second material, and on the negative power given to the lens and on the radius of curvature of the front face of the latter. In conventional ophthalmic lens production methods (injection molding for example) it is known that the thickness of the edge will also depend on the basic diameter of the lens used to produce the ophthalmic lens intended for a particular frame geometry. In the present case, by virtue of the use of an additive manufacturing process, the ophthalmic lens may be produced directly with the geometry (or with a shape close to the geometry) of the frame and the process is therefore no longer subject to this constraint.

By way of illustration, the table below gives thicknesses at the edge of 65 mm-diameter ophthalmic lenses for myopic individuals, for powers varying from one diopter to eight diopters and for materials having various refractive indices n. This table for example illustrates that, for a lens of a power of 4 diopters, an edge thickness saving of 44% and 37% is obtained, depending on whether the lens is made of a material with an index of 1.67 or 1.60, respectively, relative to a material with an index of 1.50.

| Correction (diopters) | Thickness at the edge (mm) for a material of n = 1.5 | Thickness at the edge (mm) for a material of n = 1.6 | Thickness at the edge (mm) for a material of n = 1.74 |
|---|---|---|---|
| 8 | 11.6 | 7.7 | 5.8 |
| 6 | 9.0 | 6.0 | 5.2 |
| 4 | 6.6 | 4.2 | 3.7 |
| 2 | 4.5 | 2.7 | 2.7 |
| 1 | 4.2 | 2.1 | 2.0 |

Producing ophthalmic lenses for myopic individuals according to the teachings of the invention has a second advantage directly related to the optical properties of the lens. Specifically, the ophthalmic lenses obtained by the process proposed above have an optimized sphericity and therefore improved optical qualities.

Specifically, as it is possible to thin the lens outside of the useful zone (central portion), and therefore in the peripheral portion, it is possible to decrease distortions related to the power of the lens and astigmatism. In particular, when the two faces of the lens are curved, the radius of curvature of the back face will in fact be closer to the value of the radius of curvature of the front face, or even identical or almost identical thereto, this accordance of the radii of curvature of the front and back faces allowing geometrical aberrations to be directly decreased, and therefore the optical quality of the product to be increased. Oblique astigmatism and power defects are thus minimized. The field of vision of the wearer, and in particular his peripheral field of vision, is therefore improved.

The invention claimed is:

1. A process for manufacturing a negative ophthalmic lens comprising a central portion and a peripheral portion, the process comprising the following steps:
    forming the central portion by depositing a first composition forming voxels of a first material having a first refractive index, the central portion having a peripheral zone at its periphery;
    forming the peripheral portion by depositing a second composition forming voxels of at least one second material having a second refractive index, the second composition being different from the first composition, the second refractive index being strictly higher than the first refractive index; and
    forming an intermediate portion located between said peripheral zone of the central portion and said peripheral portion, by forming voxels comprising the first material and the second material, the refractive index of said intermediate portion being strictly higher than the refractive index of said central portion and strictly lower than the refractive index of said peripheral portion, the intermediate portion being formed from a plurality of intermediate portions between said central portion and said peripheral portion, the refractive index of each of said intermediate portions increasing radially from the central portion to the peripheral portion, the radial refractive index variation being obtained by forming voxels comprising, in succession from the central portion to the peripheral portion, a decreasing amount of said first material and an increasing amount of said second material.

2. The manufacturing process as claimed in claim 1, wherein the first refractive index is lower than or equal to 1.59.

3. The manufacturing process as claimed in claim 2, wherein the first refractive index is comprised between 1.50 and 1.59, inclusive.

4. The manufacturing process as claimed in claim 1, wherein the second refractive index is higher than or equal to 1.60.

5. The manufacturing process as claimed in claim 4, wherein the second refractive index is comprised between 1.60 and 1.80, inclusive.

6. The manufacturing process as claimed in claim 1, wherein the voxels of the first material are formed by depositing the first composition by a first printing nozzle and the voxels of the second material are formed by depositing the second composition by a second printing nozzle, said first and second printing nozzles being a single nozzle or two separate nozzles.

7. The manufacturing process as claimed in claim 1, wherein the voxels of the first material are formed by depositing a thermoplastic polymer in an initial liquefied state or fluid phase by a first dispensing unit and the voxels of the second material are formed by depositing a thermoplastic polymer in an initial liquefied state or fluid phase by a second dispensing unit, the first and second dispensing units being a single unit or two separate units.

8. The manufacturing process as claimed in claim 1, wherein the voxels of the first and second material are formed by melting polymer powder.

9. The manufacturing process as claimed in claim 1, wherein the voxels of the first and second material are formed by stereolithography.

10. The manufacturing process as claimed in claim 1, wherein the voxels of the first and second material are formed by extruding a thermoplastic filament.

11. The manufacturing process as claimed in claim 1, wherein the central portion has a generally circular or elliptical shape.

12. The manufacturing process as claimed in claim 1, wherein the central portion has a generally elliptical shape.

13. A negative ophthalmic lens obtained by a process as claimed in claim 1.

14. A process for manufacturing a negative ophthalmic lens using an additive manufacturing machine comprising a first nozzle delivering a first material and a second nozzle delivering a second material, the first material having a first refractive index and the second material having a second refractive index, the first refractive index being lower than the second refractive index, the process comprising:

forming a central portion by depositing a first set of voxels by means of the first nozzle;

forming an intermediate portion by depositing a second set of voxels by means of the first nozzle and the second nozzle, wherein the intermediate portion includes first zones located near the central portion and second zones distant from the central portion, and wherein depositing the second set of voxels includes depositing a larger proportion of the first material delivered by the first nozzle in the first zones and depositing a larger proportion of the second material delivered by the second nozzle in the second zones; and     forming a peripheral portion by depositing a third set of voxels by means of the second nozzle.

\* \* \* \* \*